United States Patent [19]
Bondarev et al.

[11] 3,815,745
[45] June 11, 1974

[54] DEVICE FOR EVALUATING THE QUALITY OF CAKE IN INTERMITTENT FILTERS

[76] Inventors: Vitaly Petrovich Bondarev, ulitsa Pastera, 10, kv. 6; Georgy Varlamovich Tusunian, 1 tupik Yakova Nikoladze 10; Genady Georgievich Budenny, Varketilsky massiv, 10 Kvartal, korpus 16, kv. 8; Nodar Vladimirovich Mgeladze, Kakhetinskoe shosse, 17, kv. 10; Andr Vladimirovich Anisimov; Georgy Mikhailovich Saradzhev; Suren Emmanuilovich Shakhbudagian-Shou, all of Tbilisi; Leonid Vladimirovich Oringolts, Berdichev, all of U.S.S.R.

[22] Filed: Nov. 13, 1972

[21] Appl. No.: 306,337

Related U.S. Application Data

[63] Continuation of Ser. No. 110,002, Jan. 27, 1971, abandoned.

[52] U.S. Cl.................... 210/96, 210/104, 210/106

[51] Int. Cl............................................ B01d 35/00
[58] Field of Search....... 210/86, 96, 103, 104, 106, 210/108

[56] References Cited
UNITED STATES PATENTS

| | | | |
|---|---|---|---|
| 2,912,110 | 11/1959 | Stoltenberg | 210/86 X |
| 2,963,158 | 12/1960 | Jung | 210/86 |
| 3,212,639 | 10/1965 | Anderson | 210/106 X |
| 3,410,292 | 11/1968 | Bennett et al. | 210/96 X |

*Primary Examiner*—John Adee
*Attorney, Agent, or Firm*—Holman & Stern

[57] ABSTRACT

A device for determining the quality of cake in intermittent filters comprising at least one cake thickness sensor, which functions during the step of slurry filtration, and is further furnished with cake washing degree sensors and cake drying degree sensors, the output of each of the sensors is coupled to the input of a measuring unit only during a corresponding filter operation step.

3 Claims, 1 Drawing Figure

PATENTED JUN 11 1974 3,815,745
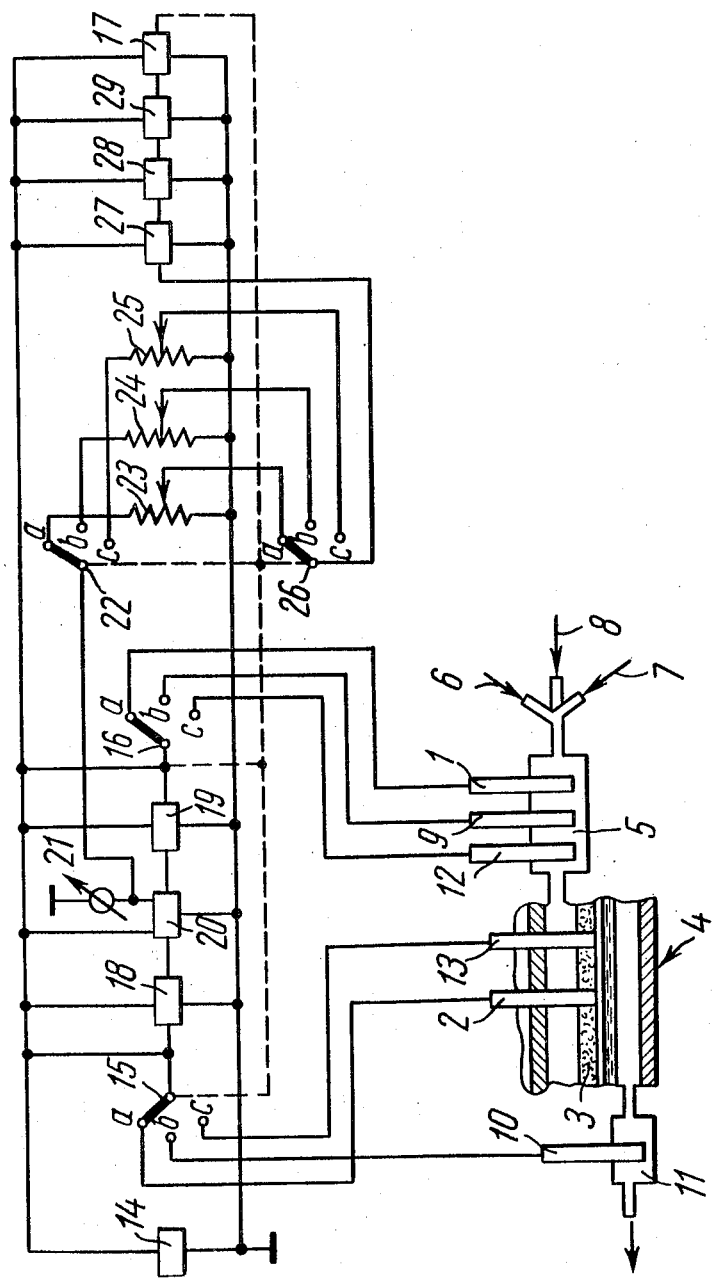

DEVICE FOR EVALUATING THE QUALITY OF CAKE IN INTERMITTENT FILTERS

This is a continuation, of U.S. Pat. application Ser. No. 110,002, filed Jan. 27, 1971 now abandoned.

BACKGROUND OF THE INVENTION

The present invention relates to intermittent filters and, more particularly, to devices for determining the quality of cake in intermittent filters.

There is known a device for determining the quality of cake in intermittent filters from the thickness of said cake measured by an instrument developed in the USA by Durco Co. (see "Filter-building abroad," TsNII-TIAM, Moscow, 1963).

However, the above device provides no means of controlling the degree of cake washing and drying, thereby necessitating time-consuming laboratory analysis which involve direct contact of personnel with noxious fumes given off by aggressive media, and is further unsuitable for automating the total cycle of filter operation with regard to process variables.

SUMMARY OF THE INVENTION

It is an object of the present invention to eliminate the aforesaid disadvantages.

It is a further and more specific object of the present invention to provide a device for controlling the quality of filter cake which will be capable of measuring, apart from cake thickness, the degree of cake washing and drying.

Accordingly, the invention consists in a device for determining the quality of cake in intermittent filters comprising at least one cake thickness sensor and a measuring unit whose input is coupled to the output of the cake thickness sensor during the step of filtration, wherein provision is made for cake washing degree sensors and cake drying degree sensors, the output of each sensor being coupled to the input of the measuring unit only during a corresponding step of filter operation.

It is expedient to incorporate in the measuring unit an amplifier whose input is coupled to the output of a corresponding sensor during the steps of filtration, cake washing and cake drying of the filter operation cycle, the output of said amplifier being coupled to an indicating instrument.

It is further preferable that the measuring unit be furnished with cake thickness, washing degree and drying degree setters, as well as with a filter operation sequence switch, provision being made to couple in the course of each step the input of a corresponding setter to the amplifier output, while the output of the setter is coupled to the input of the filter operation sequence switch.

The present device makes it possible to control the operation of all intermittent filter types so as to attain optimum performance with regard to process variables and to improve the quality of end products.

BRIEF DESCRIPTION OF THE DRAWING

The present invention is illustrated hereinbelow by the description of an exemplary embodiment thereof with reference to the accompanying drawing which shows a block diagram of the device according to the invention.

DETAILED DESCRIPTION OF A PREFERRED EMBODIMENT

Shown in the drawing is a device for determining the quality of filter cake which comprises cake 3 thickness sensors 1 and 2, one sensor being mounted in filter chamber 4, and the other in manifold 5 furnished with connecting pipes 6, 7, and 8 for feeding the slurry, wash liquid, and drying air, respectively; cake washing degree sensors 9 and 10, one sensor being mounted in manifold 5, and the other in filtrate and wash liquid discharge pipeline 11; cake drying degree sensors 12 and 13, one sensor being mounted in manifold 5, and the other in filter chamber 4.

Cake thickness sensors 1 and 2, cake washing degree sensors 9 and 10, cake drying degree sensors 12 and 13 and other device components described hereinbelow are energized from stabilized voltage power pack 14.

Cake thickness sensors 1 and 2, cake washing degree sensors 9 and 10, and cake drying degree sensors 12 and 13 are coupled via contacts 15 and 16 of filter operation sequence switch unit 17, these contacts corresponding to the steps of slurry filtration, cake washing and cake drying, to the inputs of detectors 18 and 19, the outputs of said detectors being coupled to the inputs of differential amplifier 20. Directly connected to the output of differential amplifier 20 is indicating instrument 21, while the inputs of setters 23, 24, and 25, which correspond to the steps of filtration, cake washing, and cake drying, are coupled to the output of the differential amplifier via switch contacts 22. The outputs of setters 23, 24, and 25 are coupled to switch unit 17 via switch contacts 26 and series connected amplifier 27, alarm 28, and actuating mechanism 29.

The device according to the present invention functions in the following manner. Setters 23, 24, and 25 are adjusted so as to correspond to the desired values of cake thickness, washing degree and drying degree. Prior to filter operation commencement, switch contacts 15, 16, 22, and 26 are set by switch unit 17 in the position "a" corresponding to the step of filtration, i.e., to slurry feed from connecting pipe 6 via manifold 5 to filter chamber 4. As long as no cake has formed on the filtering medium of filter chamber 4 filled with the slurry via manifold 5, the slurry contained in filter chamber 4 and in manifold 5 will exhibit identical conductivities. Here cake thickness sensors 1 and 2 give equal signals, and the indicating instrument reads zero. In the region of cake formation in filter chamber 4 there occurs conductivity diminution as the process of filtration progresses, the current recorded by the indicating instrument being proportional to the difference between the conductivity of the slurry fed to filter chamber 4 and conductivity in the region of the growing cake.

The signal from the differential amplifier output is sent via switch contact 22, setter 23, switch contact 26, and amplifier 27 to alarm 28. Once the cake thickness attains the value adjusted by setter 23, the alarm, actuating mechanism and switch unit will be actuated consecutively. Switch unit actuation results in switching over the filter from the filtration step to the cake washing step and involves resetting switch contacts 15, 16, 22 and 26 from the position "a" (filtration step) to the position "b" (cake washing step), cake thickness sensors 1, 2 being deenergized and cake washing degree sensors 9, 10 being simultaneously energized.

At the commencement of the cake washing step, the wash liquid is fed from connecting pipe 7 via manifold 5 to filter chamber 4. When the first portion of the spent wash liquid emerges from filter chamber 4 to pipeline 11, the difference between the conductivity of the wash liquid in manifold 5 and that of the spent wash liquid in pipeline 11 will be at a maximum, the readings of indicating instrument 21 being accordingly high. The difference between the conductivity of the fresh wash liquid and that of the discharged spent wash liquid diminishes in the course of the cake washing step and once the cake washing degree preset by setter 24 is attained, alarm 28, actuating mechanism 29 and switch unit 17 will be actuated consecutively. Switch unit actuation results in switching over the filter from the cake washing step to the cake drying step and involves resetting switch contacts 15, 16, 22 and 26 from the position "*b*" (cake washing step) to the position "*c*" (cake drying step), as well as deenergizing cake washing degree sensors 9, 10 and simultaneously energizing cake drying degree sensors 12, 13.

During the cake drying step, air is fed from connecting pipe 8 via manifold 5 to filter chamber. At the commencement of the cake drying step, the difference between the conductivity of the cake and that of the slurry in manifold 5 is at a minimum and corresponds to the maximum moisture content, the reading of indicating instrument 21 being accordingly low. The difference between the conductivity of the cake and that of the slurry increases in the course of the cake drying step and once the cake moisture contant preset by setter 25 is attained, alarm 28, actuating mechanism 29 and switch unit 17 will be actuated consecutively. Switch unit actuation results in switching over the filter from the cake drying step to the cake discharge step, the switch contacts being set in the position corresponding to the filtration step.

After discharging the cake from the filter, the device of the invention commences a new operating cycle in the sequence described herein before.

What is claimed is:

1. A device for controlling a required quality such as thickness, degree of washing and drying of filter cake in an intermediate filter during respective filtering, washing and drying operations which filter has a filter chamber with an inlet manifold through which sequentially passes slurry, wash liquid and drying air depending upon which respective one of said filtering, washing and drying operations is taking place, and a filtrate discharge outlet through which passes filtrate and discharge wash-liquid, said device comprising:

a pair of thickness sensor means, one of which is mountable in said inlet manifold, the other in said filter chamber, said pair of thickness sensor means providing a first difference signal therebetween representative of the thickness of said cake during said filtering operation;

a pair of washing sensor means, one of which is mountable in said inlet manifold, the other in said filtrate discharge outlet, said pair of washing sensor means providing a second difference signal therebetween representative of the degree of washing of said cake during said washing operation;

a pair of drying sensor means, one of which is mountable in said manifold, the other in said filter chamber, said pair of drying sensor means providing a third difference signal therebetween representative of the degree of drying of said cake during said drying operation;

measuring means sequentially connected to said pair of thickness sensor means, said pair of washing sensor means and said pair of drying sensor means, for sequentially measuring said first, second and third difference signals, said measuring means providing respective output signals thereof and determining when each of said respective output signals attain set values representative of said required quality of said cake;

sequence switch means operatively associated with said measuring means and said determination means for sequentially selecting each of said filtering, washing and drying operations and corresponding respective ones of said sequential connections of said measuring means as each of said respective output signals attain said set values to thereby control said required quality of said filter cake.

2. A device as claimed in claim 1, wherein said measuring means includes an amplifier having its output sequentially connected to respective ones of said pairs of sensor means and its output connected to an indicator means for indicating said respective output signals of said measuring means.

3. A device as claimed in claim 2, wherein said measuring means includes at least three quality value selector means, each selector means being pre-set to each of said set values representative of said required quality of said filter cake.

* * * * *